ID Patented Dec. 29, 1970

3,551,134
QUICK-KILLING HERBICIDE-OIL MIXTURE
Allen J. Brenteson, Bogota, Colombia, assignor to Rohm and Haas Company, Philadelphia, Pa., a corporation of Delaware
No Drawing. Filed June 9, 1967, Ser. No. 644,808
Int. Cl. A01n 9/20
U.S. Cl. 71—118
2 Claims

ABSTRACT OF THE DISCLOSURE

A biologically active formulation comprising a mixture of 3,4-dichloropropionanilide and a highly refined paraffinic petroleum oil having a narrow distillation range is applied at a low rate to the locus of an agricultural crop to quickly and effectively control the growth of weeds without causing unacceptable harm to the agricultural crop.

---

This invention relates to a process where novel herbicidal compositions are applied at a relatively low rate to the locus of the rice crop to effectively control the growth of weeds without causing undesirable injury to the rice crop, and thus effectively increase the yield of the crop. More particularly this invention relates to the use of a formulation comprising a herbicidally active mixture of 3,4-dichloropropionanilide (propanil), which is a selective post-emergence herbicide, and an oil, as hereinafter defined, for the effective control of weed growth in a rice crop.

Propanil has been used as the sole active ingredient in contact-type herbicide formulations having preferential properties which selectively kill various weeds without injuring rice plants, such as paddy field rice and upland rice. More recently it has been prepared as an emulsifiable concentrate which is diluted to a concentration of from about 0.2 to 0.4 percent with water and spread on stems and leaves of the growing plant. The use of propanil formulations entails certain disadvantages. For example, the problem of producing a propanil spray formulation having improved resistance to weathering that would effectively control the growth of weeds in rice crop in an environment characterized by frequent rainfall has not been solved. An additional problem, not specifically related to the use of propanil in an oil formulation, but directly related to the use of biologically active oils is the high rate of application required for an effective dosage of such biologically active oil formulations. For example, the normal rate of application for herbicidal oils is a dosage range of from about 50 to 100 gallons per acre. It would be economically advantageous, particularly in areas where rice is cultivated, to have a weed killing formulation that may be applied at low rates of application. A reduced weight and volume of the material to be applied to the area to be treated is particularly important for aerial application of herbicidal materials.

Formulations comprising a mixture of a fungicide and an oil have been used generally to control fruit diseases. For example, a mixture of zineb and a fungicidal oil has been used to control banana leaf spot. However, improved biological activity can't be predicted, as a matter of course, for mixtures of biologically active materials in combination with an oil. For example, mixtures of zineb, or copper oxychloride in oil did not increase disease control beyond that obtained from the oil alone in low volume spray tests for the control of Sigatoka disease on the Gros Michel banana. The prior art has cautioned that in certain instances the addition of copper fungicide to a mineral oil increased the risk of phytotoxicity in a banana leaf spot control test.

The prior art also discloses the use of oils as dormant sprays for the control of mites, aphids and scale insects on deciduous fruit, citrus trees and ornamentals. For the most part, biologically active spray oils have been largely restricted to oil sprays containing insecticides, such as lindane, malathion, and parathion; fungicides, such as Bordeaux mixture, dodine, ferbam, glyodin, thiram, and zineb; and miticides, such as dicofol and tetradifon. In addition to disclosing the use of certain pesticide-oil combinations, the prior art has also cautioned against the use of certain combinations such as lime-sulfur, captan, dichlone, folpet, or carbaryl.

The teaching of the prior art relating to the combination of herbicidally active materials with mineral oils is extremely limited. The only teaching of note is the use of a mixture of atrazine (2-chloro-4-(ethylamino)-6-isopropylamino-s-triazine) and a mineral oil as a post-emergence foliar spray on crops, such as corn, sorghum and sugar cane.

In accordance with this invention a herbicidal formulation comprising a mixture of propanil and a highly refined paraffinic petroleum oil having a low viscosity and narrow distillation range, described more fully hereinafter as Oil-R, contained in a carrier consisting of a solvent and emulsifier system, or dispersed solely in a suitable solvent without an emulsifier, controls the growth of undesirable plants, such as barnyard grass, in an area containing growing desirable plants, such as rice, faster and more effectively than a herbicidal composition without an oil component and having propanil as the sole active ingredient. A gallon unit of the herbicidal formulation of this invention contains from about 17 to about 50 weight percent propanil, from about 5 to about 60 weight percent Oil-R, from about 20 to about 50 weight percent solvent and up to about 15 weight percent emulsifier. The preferred range of the ingredients is from about 26 to about 36 weight percent propanil, from about 5 to about 25 weight percent oil, from about 35 to about 50 weight percent solvent and from about 5 to about 10 weight percent emulsifier. Based on a weight-volume relationship, a gallon unit of the formulation of this invention comprises from about 1.5 to about 4.0 pounds propanil, and from about 0.05 to about 0.6 gallon Oil-R.

The oil designated hereinabove as Oil-R is characterized by a viscosity range of about 66–74 SUS units at 100° F., an API gravity at 60° F. of about 33 (minimum), an ASTM percent unsulfonated residue of about 92 (minimum), a maximum pour point of about 20° F., a boiling range of about 616–625° F., and a distillation range at reduced pressures, following ASTM procedure D–1160, of 95 (maximum) in the 10–90 percent range. The preferred oil, designated hereinafter as Oil-S, has a viscosity of about 71 SUS units at 100° F., an API gravity at 60° F. of about 33.3, an ASTM percent unsulfonated residue of about 92 (minimum), a pour point of about 5° F., and a distillation range, at reduced pressure, of 62 in the 10–90 percent range following the procedure of ASTM D–1160. An oil having this very narrow boiling range exhibits a relatively short residence period on the plant surface, thus reducing the danger of injury to the agricultural crop.

The heribicidal formulation of this invention can be applied by a low-volume technique. For example, a herbicidal formulation consisting of propanil, oil and a suitable solvent may be applied neat, or without dilution with water, so that the total carrier volume per acre is less than one gallon per acre. When the plants in the locus to be protected from weeds are in a tender state, the propanil-oil mixture of this invention can be applied to the locus to be protected at a rate of from about 0.1 to about 3.0 gallons per acre; the preferred range of application is from about 0.25 to about 1.5 gallons per acre. This low-volume range of application is sufficient for effective control of the weed growth, and is unexpectedly low compared to the usual prior art rates of application for biocidal oils of 50 to 100 gallons per acre.

The mixture of propanil and oil may also be in the form of an emulsifiable concentrate which additionally contains a suitable solvent and an emulsifier. Water may be added to the emulsifiable concentrate and the resulting formulation can be applied to the locus to be protected at a rate of up to 100 gallons per acre; when water is added to the emulsifiable concentrate, a rate of application having a total carrier volume of from 3 to 10 gallons per acre has been found to be very effective.

The propanil-oil formulation of this invention is characterized by an extremely rapid weed-killing potential and the ability to persist on the surface of the weeds and thereby resist weathering. More specifically, the mixed herbicidal composition of this invention kills barnyard grass and other weeds in the locus of a rice crop, with unusual speed and persists in the locus to be treated, even under extremely adverse weather conditions, such as frequent rainfall. The quick-killing and high persistence characteristics of the herbicidal formulation of this invention are especially advantageous for aerial applications in rice growing areas. For example, an error in spraying the area to be treated may be detected within a shorter period of time, and can therefore be rapidly corrected. A saving of a single day, or even a few hours is extremely advantageous in rice crop growing areas because of the ever present danger of heavy rainfall. Other advantages based on climatic conditions, etc. are obvious.

Representatives of the solvents that may be employed in this invention are solvents suitable for propanil and misible with the oil component, such as methylhexylketone, isophorone, monochlorobenzene, o-dichlorobenzene, xylene, methylisobutylketone, cyclohexanol, acetone, ethanol, isobutanol, furfural, isopropylacetate, mesityloxide, 2-(1-cyclohexenyl)cyclohexanone, and dimethylformamide, and the like.

Representatives of the emulsifier are solvent-soluble emulsifiers, such as surfactants of the anionic, cationic, or nonionic types, either alone or in a mixture. These include mercaptans, carboxylic acids, reactive amines, or ethylene oxide derivatives or alkylphenols, or long-chained alcohols, such as octylphenoxypolyethoxyethanols having 8 to 100 ether groups; (higher alkyl) dimethylbenzenylammonium chlorides; and various sulfates and sulfonates known to be surface-active agents, such as sodium dodecyl sulfate, sodium octylphenoxyethoxyethyl sulfonate, calcium dodecyl-benzenesulfonate, sodium dioctyl sulfosuccinate, and long-chained acyl taurates. Emulsifiable concentrates may be prepared to contain from about 1.5 to 4 lbs. of propanil and from about 0.5 to about 0.6 gallon of Oil-R. Certain adjuvants, if desired, may also be incorporated into the system, such as wetting agents, dispersing agents, stickers, and adhesives, and the like, in accordance with usual agricultural practices.

To assist those skilled in the art to practice the present invention, the following procedures are suggested by way of illustration, parts and percentages being by weight unless otherwise specifically noted.

(1) To a mixture of about 25.6 weight percent 3,4-dichloropropionanilide, about 19.9 weight percent isophorone, about 18.4 weight percent xylene and about 7.1 weight percent octylphenoxypolyethoxyethanol, having 70 ethylene oxide units, is added about 29 weight percent of a highly refined paraffinic petroleum oil, designated hereinabove as Oil-R, to provide a herbicidal composition containing about 2 lbs. of 3,4-dichloropropionanilide per U.S. gallon.

(2) To a mixture of about 38.3 weight percent 3,4-dichloropropionanilide, about 38.2 weight percent isophorone, and about 5 weight percent octylphenoxypolyethoxyethanol, having about 70 ethylene oxide units, is added about 18.5 weight percent of a highly refined paraffinic petroleum oil, designated hereinabove as Oil-S, to provide a herbicidal composition containing about 3 lbs. 3,4-dichloropropionanilide per U.S. gallon.

The herbicidal compositions thus prepared may be applied broadcast to a growing area, or to the environment of a growing crop, or in a narrow band over a growing row crop, or in a directed spray about a growing crop, or in any other manner in which weed-controlling agents are applied. As discussed hereinabove the rates of application may range from about 0.1–3 gallons per acre; the preferred range is from about 0.25–1.5 gallons per acre.

The practical herbicidal activity of a formulation containing a mixture of propanil and Oil-S was established by field tests involving the control of barnyard grass in a rice field. The crop was rice of the Blue Bonnet variety having 3–4 leaves and 7–8 inches tall. The barnyard grass was in the 3-leaf to early tillering stage. The crop was treated 17 days after planting. One inch of rain developed in the 24 hour period immediately following treatment of the crop. The herbicide compositions were applied with a ground sprayer. The spraying equipment consisted of a knapsack sprayer with 80015 TEE–JET tips (20 p.s.i., 3 m.p.h., 10 gallons per acre). The crop was inspected 3 days after treatment, and 6 days after treatment. A small amount of transitory tip burn developed on the rice foliage. The tip burn disappeared within two weeks after treatment without any adverse effect on final productivity. Table I gives the results of the field tests relating to the percent control of barnyard grass.

TABLE I

| Amount/acre | | Percent barnyard grass control (3–4 Leaf) | |
| --- | --- | --- | --- |
| Propanil (lbs.) | Oil-S (gal.) | 3 days after treatment | 6 days after treatment |
| 2 |  | 60 | 80 |
| 2 | 0.3 | 65 | 82 |
| 2 | 0.5 | 75 | 82 |
| 2 | 1.5 | 70 | 87 |
| 3 |  | 80 | 85 |
| 3 | 0.5 | 85 | 97 |
| 3 | 0.5 | 87 | 95 |
| 3 | 1.5 | 85 | 100 |
| 5 |  | 82 | 100 |

Additional field tests were conducted involving the application of herbicidal composition to 2–3 leaf barnyard grass. In the tests, the herbicidal composition consisted of propanil at 1.5, 3.0, and 4.5 lbs. per acre combined with 0, 0.5 or 1.5 gallons of Oil-S per acre. Some test portions of grass were irrigated by an overhead sprinkler to simulate an accumulation of 1 inch of rainfall in the 24 hour period immediately following application. The treated areas were inspected 8 and 16 days after treatment to determine the percent barnyard grass control. Table II gives the results of these tests.

From Tables I and II it can be seen that a formulation containing a mixture of propanil and Oil-S controls the growth of barnyard grass more rapidly than a formulation containing propanil as the sole active ingredient.

TABLE II

| Amount/acre | | Percent barnyard grass control | | | |
| --- | --- | --- | --- | --- | --- |
|  |  | Non-irrigated | | Irrigated | |
| Propanil (lbs.) | Oil-S (gal.) | 8 days after treatment | 16 days after treatment | 8 days after treatment | 16 days after treatment |
| 1.5 |  | 55 | 70 | 30 | 30 |
| 1.5 | 0.5 | 55 | 85 | 40 | 30 |
| 1.5 | 1.5 | 60 | 100 | 60 | 50 |
| 3.0 |  | 60 | 98 | 40 | 40 |
| 3.0 | 0.5 | 75 | 100 | 80 | 80 |
| 4.5 |  | 70 | 100 | 50 | 40 |
| 4.5 | 0.5 | 85 | 100 | 60 | 80 |
| 4.5 | 1.5 | 97 | 98 | 95 | 95 |

It can be seen that the herbicidal composition of this invention controls the growth of barnyard grass more effectively than the use of propanil alone, and can reduce the amount of propanil needed per acre by about twenty-fivepercent. The herbicidal composition of this invention was further characterized by increased effectiveness under conditions of simulated rainfall. In addition, the herbicidal composition of this invention does not cause any substantial injury to the rice crop.

It is to be understood that changes and variations may be made without departing from the spirit and scope of the invention as defined by the appended claims.

What is claimed is:

1. A method for controlling barnyard grass in rice which comprises applying to the barnyard grass at a tender state a herbicidal composition consisting essentially of 3,4-dichloropropionanilide dispersed in a highly refined paraffinic petroleum oil having a viscosity range of about 66 to 74 SUS units at 110° F., an API gravity at 60° F. of about 33, a pour point of about 20° F., and a boiling range of about 616–625° F., said composition being applied at a rate of from about 0.1 to about 3.0 gallons per acre.

2. A method for controlling barnyard grass in rice which comprises applying to the barnyard grass at a tender state a herbicidal composition consisting essentially of from about 17 to about 50 weight percent 3,4-dichloropropionanilide, from about 5 to 60 weight percent of a highly refined paraffinic petroleum oil having a viscosity range of from about 66 to 74 SUS units at 100° F., an API gravity at 60° F. of about 33, a pour point of about 20° F., and a boiling range of from about 616–625° F., from about 20 to about 50 weight percent of a solvent and up to about 15 weight percent of an emulsifier, said composition being applied at a rate of from about 0.1 to about 3.0 gallons per acre.

References Cited

UNITED STATES PATENTS 3,333,948   8/1967   Takematsu et al. ____ 71—123X

JAMES O. THOMAS, JR., Primary Examiner

U.S. Cl. X.R.

71—124